(12) United States Patent
Du et al.

(10) Patent No.: US 10,108,259 B2
(45) Date of Patent: Oct. 23, 2018

(54) INTERACTION METHOD, INTERACTION APPARATUS AND USER EQUIPMENT

(71) Applicant: Beijing Zhigu Rui Tuo Tech Co., Ltd., Beijing (CN)

(72) Inventors: Lin Du, Beijing (CN); Dayong Ding, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 99 days.

(21) Appl. No.: 15/219,731

(22) Filed: Jul. 26, 2016

(65) Prior Publication Data

US 2017/0031438 A1 Feb. 2, 2017

(30) Foreign Application Priority Data

Jul. 31, 2015 (CN) .......................... 2015 1 0463498

(51) Int. Cl.
G06F 3/00 (2006.01)
G06F 3/01 (2006.01)
G06F 3/147 (2006.01)

(52) U.S. Cl.
CPC .............. *G06F 3/013* (2013.01); *G06F 3/147* (2013.01); *G09G 2320/0261* (2013.01); *G09G 2354/00* (2013.01)

(58) Field of Classification Search
CPC ..... G06F 3/013; G06F 3/147; G09G 2354/00; G09G 2320/0261
See application file for complete search history.

(56) References Cited

U.S. PATENT DOCUMENTS

| 2015/0002394 A1* | 1/2015 | Cho | G02B 27/0093 |
| | | | 345/156 |
| 2015/0301596 A1* | 10/2015 | Qian | G06F 3/013 |
| | | | 345/633 |
| 2016/0217612 A1* | 7/2016 | Petill | G06T 19/006 |

* cited by examiner

*Primary Examiner* — Muhammad N Edun

(57) ABSTRACT

Embodiments of this application disclose an interaction method, an interaction apparatus and a user equipment, where the interaction method comprises: acquiring first gazing information of at least one eye of a user when watching a virtual presentation object on a location in a gazing direction, and second gazing information of the at least one eye of the user when watching a physical object on the location in the gazing direction; and in response to that a difference between the first gazing information and the second gazing information is out of a set error range, executing an operation. In the embodiments of this application, a presentation location of the virtual presentation object may be associated with a location of the physical object in an environment accurately and conveniently by means of gazing of the user.

27 Claims, 7 Drawing Sheets

Acquire first gazing information of at least one eye of a user when watching a virtual presentation object on a location in a gazing direction, and second gazing information of the at least one eye of the user when watching a physical object on the location in the gazing direction — S110

In response to that a difference between the first gazing information and the second gazing information is out of a set error range, execute an operation — S120

INTERACTION METHOD, INTERACTION APPARATUS AND USER EQUIPMENT

TECHNICAL FIELD

This application relates to the field of a human-computer interaction technology, and in particular, to an interaction method, an interaction apparatus and a user equipment.

BACKGROUND

With development of technologies, intelligent user equipments have more types, and also have stronger functions. Near-eye devices such as intelligent glasses, and intelligent helmets are generally designed to have a strong presentation capability because their use locations are close to eyes of a user, and may present visual content such as an image or a video to the user. A transmissive near-eye device not only may present a virtual object to the user, but also may make a line of sight of the user pass through the transmissive near-eye device to observe an object in a surrounding environment.

SUMMARY

A possible objective of embodiments of this application is to provide a technical solution for interaction.

According to a first aspect, a possible implementation solution of this application provides an interaction method, comprising:

acquiring first gazing information of at least one eye of a user when watching a virtual presentation object on a location in a gazing direction, and second gazing information of the at least one eye of the user when watching a physical object on the location in the gazing direction; and in response to that a difference between the first gazing information and the second gazing information is out of a set error range, executing an operation.

According to a second aspect, a possible implementation solution of this application provides an interaction apparatus, comprising:

an information acquiring module, configured to acquire first gazing information of at least one eye of a user when watching a virtual presentation object on a location in a gazing direction, and second gazing information of the at least one eye of the user when watching a physical object on the location in the gazing direction; and a first processing execution module, configured to: in response to that a difference between the first gazing information and the second gazing information is out of a set error range, execute an operation.

According to a third aspect, a possible implementation solution of this application provides a user equipment, where the user equipment comprises:

a memory, configured to store an instruction; and a processor, configured to execute the instruction stored in the memory, where the instruction enables the processor to execute the following operations:

acquiring first gazing information of at least one eye of a user when watching a virtual presentation object on a location in a gazing direction, and second gazing information of the at least one eye of the user when watching a physical object on the location in the gazing direction; and in response to that a difference between the first gazing information and the second gazing information is out of a set error range, executing an operation.

In at least one implementation solution of the embodiments of this application, execution of an operation is determined by means of a difference between first gazing information and second gazing information respectively corresponding to a physical object and a virtual presentation object watched by a user on a location in a gazing direction, and then a presentation location of the virtual presentation object and a location of the physical object in an environment may be associated accurately and conveniently by means of gazing of the user.

For example, in some possible implementation solutions, the location of the physical object may be determined accurately and conveniently according to the presentation location of the virtual presentation object; or in some other possible implementation solutions, the virtual presentation object may be accurately presented on a presentation location on which the virtual presentation object needs to be presented relative to the physical object.

DETAILED DESCRIPTION

The detailed description of this application is further described in detail hereinafter in connection with accompanying drawings (in several accompanying drawings, same numerals denote same elements) and embodiments. The following embodiments are used to describe this application, but not used to limit the scope of this application.

It can be understood by a person skilled in the art that the terms such as "first" and "second" in this application are only used to differentiate different steps, devices or modules, and the terms neither represent any specific technical meaning, nor represent an inevitable logic sequence between the steps, the devices, or the modules.

Figure 1:
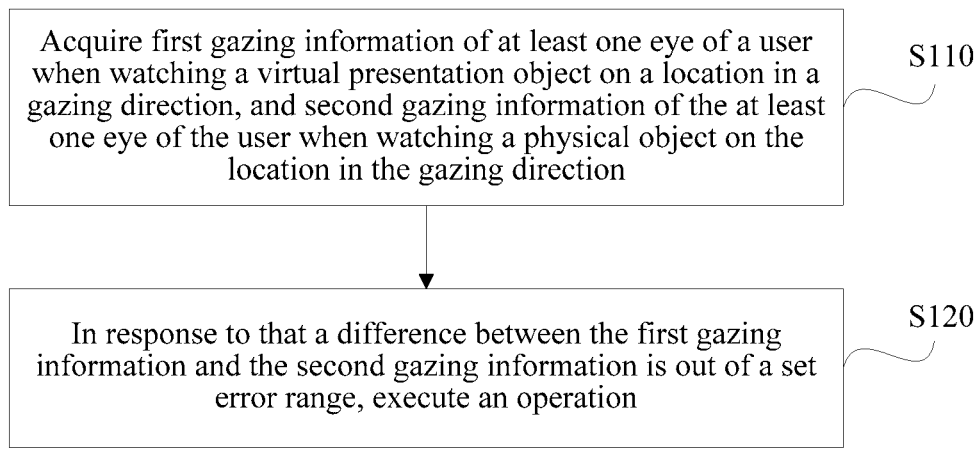
FIG. 1 is a flowchart of an interaction method according to an embodiment of this application.

As shown in FIG. 1, an embodiment of this application provides an interaction method, comprising:

S110: Acquire first gazing information of at least one eye of a user when watching a virtual presentation object on a location in a gazing direction, and second gazing information of the at least one eye of the user when watching a physical object on the location in the gazing direction.

S120: In response to that a difference between the first gazing information and the second gazing information is out of a set error range, execute an operation.

For example, an interaction apparatus provided in this application is used as an execution body of this embodiment, to perform S110 to S120. Specifically, the interaction apparatus may be disposed in a user equipment in a manner of software, hardware or a combination of software and hardware, or the interaction apparatus itself is the user equipment; the user equipment comprises but is not limited to: intelligent glasses, an intelligent helmet, a smartphone, a tablet computer, or a computer, where the intelligent glasses is further divided into intelligent frame glasses and intelligent contact lenses.

The inventor of this application finds that, accuracy in determining a distance of a gaze point of a user gazing the virtual presentation object relative to the user only by means of the first gazing information, and/or accuracy in determining a distance of the physical object relative to the user only by means of the second gazing information remains to be improved, but a difference between the first gazing information and the second gazing information may be accurately detected, and therefore, in the foregoing implementation manner of the embodiments of this application, execution of an operation is determined by means of a difference between first gazing information and second gazing information respectively corresponding to a physical object and a virtual presentation object watched by a user on a location in a gazing direction, and then a presentation location of the virtual presentation object and a location of the physical object in an environment may be associated accurately and conveniently by means of gazing of the user.

The method of this embodiment of this application is further described by means of the following implementation manner.

S110: Acquire first gazing information of at least one eye of a user when watching a virtual presentation object on a location in a gazing direction, and second gazing information of the at least one eye of the user when watching a physical object on the location in the gazing direction.

In a possible implementation manner, optionally, the first gazing information may comprise: first gazing distance information; and the second gazing information may comprise: second gazing distance information.

The first gazing distance information is related information about a distance of a gaze point relative to the user when the user gazes the virtual presentation object; the second gazing distance information is related information about a distance of a gaze point relative to the user when the user gazes the physical object.

In a possible implementation manner, optionally, the first gazing information may comprise: first electro-ocular information; and the second gazing information may comprise: second electro-ocular information.

In a possible implementation manner, the first electro-ocular information and the second electro-ocular information may be corresponding electro-ocular related information when the user watches the virtual presentation object and the physical object separately.

The electro-ocular related information may comprise, for example, at least one of the following:

information about change of a wave form of an electro-oculogram with time, electro-ocular amplitude information, frequency information of electro-ocular change and the like.

In another possible implementation manner, to improve accuracy in determining whether the difference is out of the error range, optionally, the first gazing information may comprise both the first gazing distance information and the first electro-ocular information; and the second gazing information may comprise both the second gazing distance information and the second electro-ocular information.

In this implementation manner, when it is determined whether the difference between the first gazing information and the second gazing information is out of the set error range, it may be determined that not only a difference between the first gazing distance information and the second gazing distance information is out of a first error range, but also a difference between the first electro-ocular information and the second electro-ocular information is out of a second error range.

In a possible implementation manner, optionally, the at least one eye comprises two eyes.

In an implementation manner in which the at least one eye comprises one eye, the gazing direction may be a line of sight direction of the one eye.

In an implementation manner in which the at least one eye comprises two eyes, the gazing direction may be, for example, one of the following:

a direction corresponding to a connection line from a gaze point of the two eyes to a midpoint of a connection line of the two eyes; and a direction corresponding to a bisector of an angle formed by two lines of sight respectively corresponding to the two eyes.

It may be seen from the above description that, in this implementation manner, when a user watches objects at different gazing distances in a gazing direction on a location by means of the two eyes, in addition to change of the gazing distance information or electro-ocular information, a gazing angle of the two eyes also changes, and the gazing angle may be represented by means of, for example, locations of pupils of the user in the eyes. Therefore, in a possible implementation manner, optionally, the first gazing information may comprise: first gazing angle information; and the second gazing information may comprise: second gazing angle information.

In some possible implementation manners, the first gazing information may also comprise both the first gazing angle information and the first gazing distance information and/or first electro-ocular information. The second gazing information may also comprise both the second gazing angle information and the second gazing distance information and/or second electro-ocular information.

In a possible implementation manner, the acquiring the first gazing information and the second gazing information may be: by means of a gazing information collection apparatus, collecting the first gazing information and the second gazing information; or collecting information related to the first gazing information and the second gazing information, and processing the information to obtain the first gazing information and the second gazing information.

For example, gazing distance information and/or gazing angle information of an eye of the user may be obtained in a manner of collecting an image of the eye of the user, or an image of a fundus by means of a cross-eyed camera and processing the image; electro-ocular information of the user may be collected by means of an electro-ocular sensing apparatus.

A person skilled in the art may know that, other possible gazing information may also be applied to this embodiment of this application and used as the first gazing information and the second gazing information, such as first image information and second image information of the eye of the user, and first image information and second image information of the fundus of the user, and the difference may be, for example, an image difference.

In S110, several possible implementation manners of collecting the first gazing information and the second gazing information by means of the corresponding collection apparatus are described as follows:

In a possible implementation manner, optionally, the acquiring the first gazing information comprises:

presenting the virtual presentation object to the at least one eye at a virtual presentation distance and in the gazing direction; and acquiring the first gazing information of the at least one eye.

Herein, the presenting the virtual presentation object to the at least one eye may, for example, be:

displaying content corresponding to the virtual presentation object by means of a transmissive display screen that is on a pair of intelligent glasses or an intelligent helmet and that is located in front of the eye of the user, and controlling a virtual presentation distance of display parameters to enable the user to see the virtual presentation object located at a virtual perception distance corresponding to the virtual presentation distance; or projecting content corresponding to the virtual presentation object to the fundus of the user by means of a cross-eyed projection apparatus on a head-mounted device of the user, and controlling a virtual presentation distance of projection parameters to enable the user to see the virtual presentation object located at a virtual perception distance corresponding to the virtual presentation distance.

After the virtual presentation object is presented to the at least one eye, generally, attention of the user is caught by the virtual presentation object, and then the gaze point falls on the virtual presentation object, and in this case, the collected gazing information of the at least one eye is the first gazing information.

In a possible implementation manner, optionally, S110 may comprise:

presenting the virtual presentation object to the at least one eye at a virtual presentation distance and in a presentation direction;

acquiring the first gazing information and the gazing direction of the at least one eye; and weakening or eliminating presentation of the virtual presentation object, and acquiring the second gazing information that is of the at least one eye and that is in the gazing direction.

In this implementation manner, the virtual presentation object is first presented to the user, and the first gazing information of the user when gazing the virtual presentation object is acquired (in a possible implementation manner, the virtual presentation object is perspective, and in this case, to improve accuracy of acquiring the first gazing information, the user may be instructed to watch the virtual presentation object on purpose). Then, presentation of the virtual presentation object is weakened or eliminated. For example, presentation of the virtual presentation object may be eliminated in a manner of gradually increasing presentation transparency of the virtual presentation object until the transparency is 100%. The line of sight of the user cannot fall in the air having no object, and therefore, naturally in a case in which the gazing direction is unchanged the physical object originally sheltered by the virtual presentation object is seen. In this case, the obtained gazing information of the at least one eye is the second gazing information.

It may be seen from the above description that, in this implementation manner, the first gazing information and the second gazing information of the user when respectively gazing the virtual presentation object and the physical object may be obtained in a case of basically ensuring that the gazing direction of the user is unchanged.

In another possible implementation manner, optionally, S110 may comprise:

acquiring the gazing direction and the second gazing information of the at least one eye;

determining a presentation direction of the virtual presentation object corresponding to the gazing direction according to the gazing direction;

presenting the virtual presentation object to the at least one eye at a virtual presentation distance and in the presentation direction; and acquiring the first gazing information.

In this implementation manner, gazing information of the user is acquired in a case in which the virtual presentation object is not presented to the user, and in this case, the user is inevitably gazing a physical object, and therefore, the gazing information is the second gazing information. When the second gazing information is acquired, the gazing direction in which the user gazes the physical object may be further acquired. Then, a presentation direction is determined according to the gazing direction, and therefore when the virtual presentation object is presented according to the presentation direction, the virtual presentation object is located on the gazing direction. Then, the virtual presentation object is presented to the user at a virtual presentation distance and in the presentation direction, and because the gaze point of the user falls on the virtual presentation object, the acquired gazing information of the user is the first gazing information of the user when gazing the virtual presentation object.

In addition to acquiring the first gazing information and the second gazing information by means of collection, in a possible implementation manner, the first gazing information and the second gazing information may be further acquired from at least one external device in a communication manner.

S120: In response to that a difference between the first gazing information and the second gazing information is out of a set error range, execute an operation.

A person skilled in the art may know that, in this embodiment of this application, the difference represents a difference between a distance from the virtual presentation object to the user and a distance from the physical object to the user in the gazing direction.

In a possible implementation manner, the error range may, for example, be that the difference is basically zero, that is, there is basically no difference between the first gazing information and the second gazing information. A person skilled in the art may know that, that the difference is basically zero herein is not limited to that the difference is zero, and when the difference is within a set error range, it may also be considered that the difference is basically zero. The error range may be set according to a precision requirement herein.

In another possible implementation manner, the error range may, for example, further be another possible range. For example, in a scenario of performing augmented reality presentation, a virtual presentation object needs to be projected onto a predetermined location between a physical object and a user, and the error range may be determined according to a difference between the predetermined location and a location of the physical object.

In a possible implementation manner, optionally, the operation comprises:

an operation related to a virtual presentation distance corresponding to the virtual presentation object.

For example, in a possible implementation manner, the operation related to the virtual presentation distance comprises:

adjusting the virtual presentation distance.

In a possible implementation manner, the virtual presentation distance may be tentatively turned up or turned down, and then the difference is acquired, to determine whether the difference becomes larger or becomes smaller. If the difference becomes smaller, the virtual presentation distance may continue to be adjusted, or if the difference becomes larger, the virtual presentation distance may be adjusted in an opposite direction, until the difference is within the error range.

In another possible implementation manner, the virtual presentation distance may be adjusted according to the difference. In this implementation manner, for example, whether the virtual presentation distance is larger or smaller than an actual distance of the physical object relative to the user may be determined according to the difference, and therefore the virtual presentation distance may be adjusted according to the difference purposefully. For example, in a possible implementation manner, the first gazing information and the second gazing information are respectively the first gazing distance information and the second gazing distance information, and if the difference is −20 cm, it may be determined that the virtual presentation distance is smaller than the actual distance, and in this case, the virtual presentation distance may be turned up, for example, according to the difference.

Certainly, a person skilled in the art may know that, another operation may also be applied to this embodiment of this application.

This embodiment of this application is further described by means of the following several application scenarios.

1) Automatic Modeling Scenario:

The inventor of this application finds that, in an augmented reality or virtual reality environment, to model a surrounding environment automatically is an important issue. Generally, fine modeling needs to be performed on an environment in the field of vision or an area in which a perspective virtual presentation object is planned to be projected, and many calculation capabilities need to be consumed.

For example, in this scenario, first gazing information of the user when gazing a virtual presentation object and second gazing information of the user when gazing a physical object in an environment in a corresponding gazing direction are acquired; and whether a difference between the first gazing information and the second gazing information is out of a set error range is determined:

a) if the difference is within the error range, a location of the physical object relative to the user is determined according to the gazing direction and a virtual presentation distance corresponding to the virtual presentation object (in this scenario, a perception distance of the user relative to the presented virtual presentation object is consistent with the virtual presentation distance of the virtual presentation object); or b) if the difference is out of the error range, the virtual presentation distance of the virtual presentation object is adjusted, until the difference is within the error range; and then a location of the physical object relative to the user is determined according to the gazing direction and the adjusted virtual presentation distance.

It may be seen from above description that, because the virtual presentation distance may be accurately acquired, and in this embodiment of this application, a distance of a physical object relative to the user is determined according to the virtual presentation distance, the distance of the physical object relative to the user may be accurately determined, and then a model corresponding to a current environment may be established according to the distance of the physical object relative to the user.

Corresponding to the foregoing process b), in some possible implementation manners, optionally, replacement may also be performed in the following manner, that is, if the difference is out of the error range, the virtual presentation distance may not be adjusted, and instead, the location of the physical object relative to the user is directly determined according to the gazing direction, the virtual presentation distance and the difference.

2) Presentation Calibration Scenario:

In another possible implementation manner, a model for an environment may be already established, but for a reason such as that the model is not precisely established, or that a perception distance of the user relative to a virtual presentation object is inconsistent with a virtual presentation distance of the virtual presentation object, the model does not completely match the environment. In this case, the model may be modified by means of the method of this embodiment of this application.

For example, the established model is directly presented to at least one eye of the user, and according to a difference between first gazing information of each virtual presentation object and second gazing information of each corresponding physical object in the model watched by the user respectively, a virtual presentation distance of the each virtual presentation object is adjusted, thereby achieving an objective of modifying the model.

Moreover, in an augmented reality scenario, a location relationship between a virtual presentation object and a corresponding physical object in a real environment may also be modified by means of the method of this embodiment of this application, and therefore the location relationship between the two satisfies a preset requirement.

Certainly, this embodiment of this application may be further applied to other scenarios related to virtual presentation, which are not listed one by one herein.

Persons skilled in the art can understand that, in the foregoing methods of the specific implementation manners of this application, the value of the sequence number of each step does not indicate an execution order, and the execution order of the steps should be determined according to a function and an inherent logic thereof, and should not form any limit to the implementation process of the specific implementation manners of this application.

Figure 2:
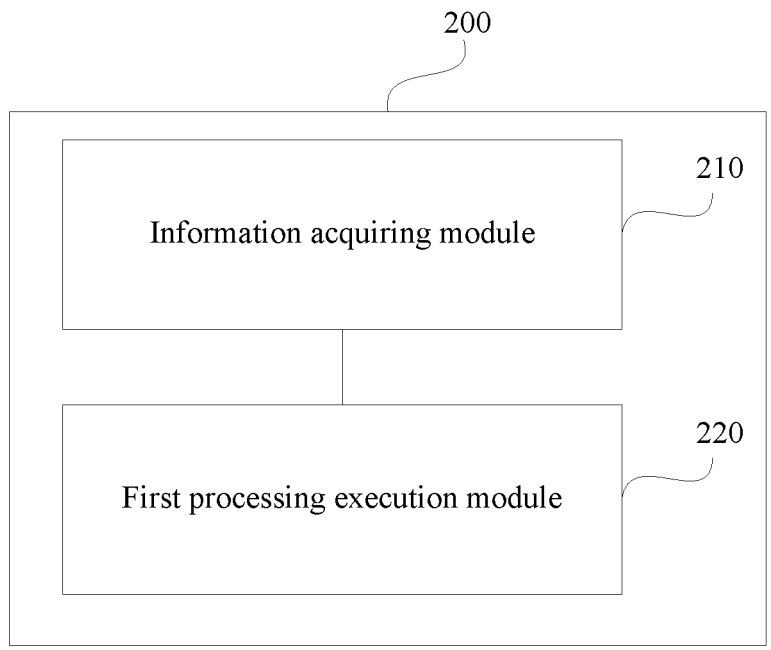
FIG. 2 is a schematic structural block diagram of an interaction apparatus according to an embodiment of this application.

As shown in FIG. 2, a possible implementation manner of this application provides an interaction apparatus 200, comprising:

an information acquiring module 210, configured to acquire first gazing information of at least one eye of a user when watching a virtual presentation object on a location in a gazing direction, and second gazing information of the at least one eye of the user when watching a physical object on the location in the gazing direction; and a first processing execution module 220, configured to: in response to that a difference between the first gazing information and the second gazing information is out of a set error range, execute an operation.

In the foregoing implementation manner of the embodiments of this application, execution of an operation is determined by means of a difference between first gazing information and second gazing information respectively corresponding to a physical object and a virtual presentation object watched by a user on a location in a gazing direction, and then a presentation location of the virtual presentation object and a location of the physical object in an environment may be associated accurately and conveniently by means of gazing of the user.

In this embodiment of this application, for further description about the first gazing information and the second gazing information, refer to corresponding description in the embodiment shown in FIG. 1.

In a possible implementation manner, the information acquiring module 210 may comprise: a communications unit, configured to acquire the first gazing information and the second gazing information from at least one external device.

Figure 4A:
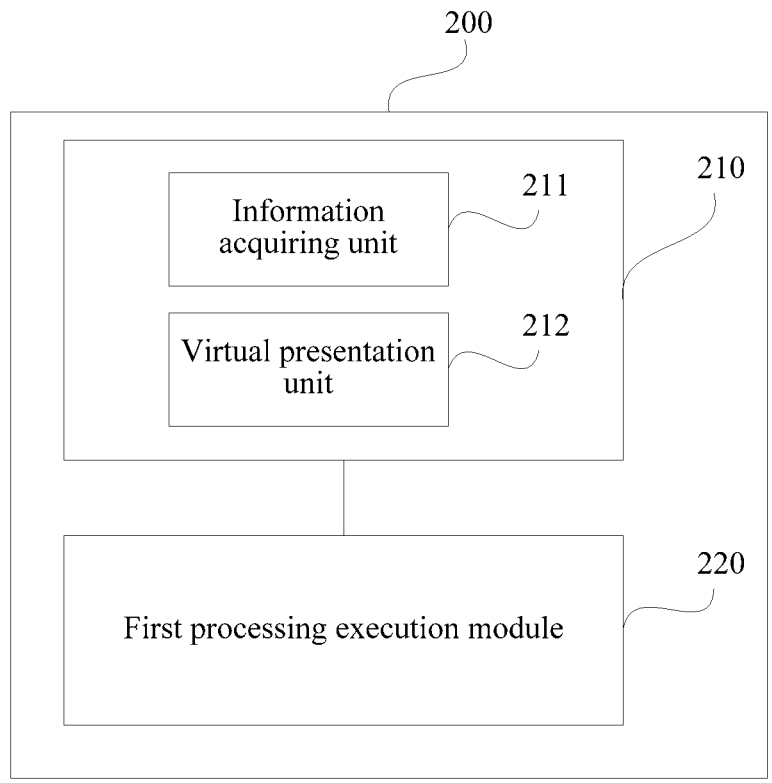
FIG. 4a to FIG. 4e are schematic structural block diagrams of five interaction apparatuses according to an embodiment of this application.

In another possible implementation manner, as shown in FIG. 4a, the information acquiring module 210 may comprise an information acquiring unit 211, where the information acquiring unit 211 may be configured to collect the second gazing information.

In a possible implementation manner, when the first gazing information and the second gazing information comprise electro-ocular information, the information acquiring unit 211 may comprise an electro-ocular sensing subunit, configured to collect the electro-ocular information. In a possible implementation manner, the electro-ocular sensing subunit may be integrated on a frame glasses.

In a possible implementation manner, when the first gazing information and the second gazing information comprise gazing distance information and/or gazing angle information, the information acquiring unit 211 may comprise a cross-eyed image sensing subunit, configured to collect image information of an eye surface or a fundus of the user, so as to obtain the gazing distance information or gazing angle information.

In a possible implementation manner, the information acquiring module 210 may further comprise:

a virtual presentation unit 212, configured to present the virtual presentation object to the at least one eye at a virtual presentation distance and in the gazing direction, where the information acquiring unit 211 may be further configured to acquire the first gazing information of the at least one eye on a condition that the virtual presentation unit presents the virtual presentation object.

Figure 3A:
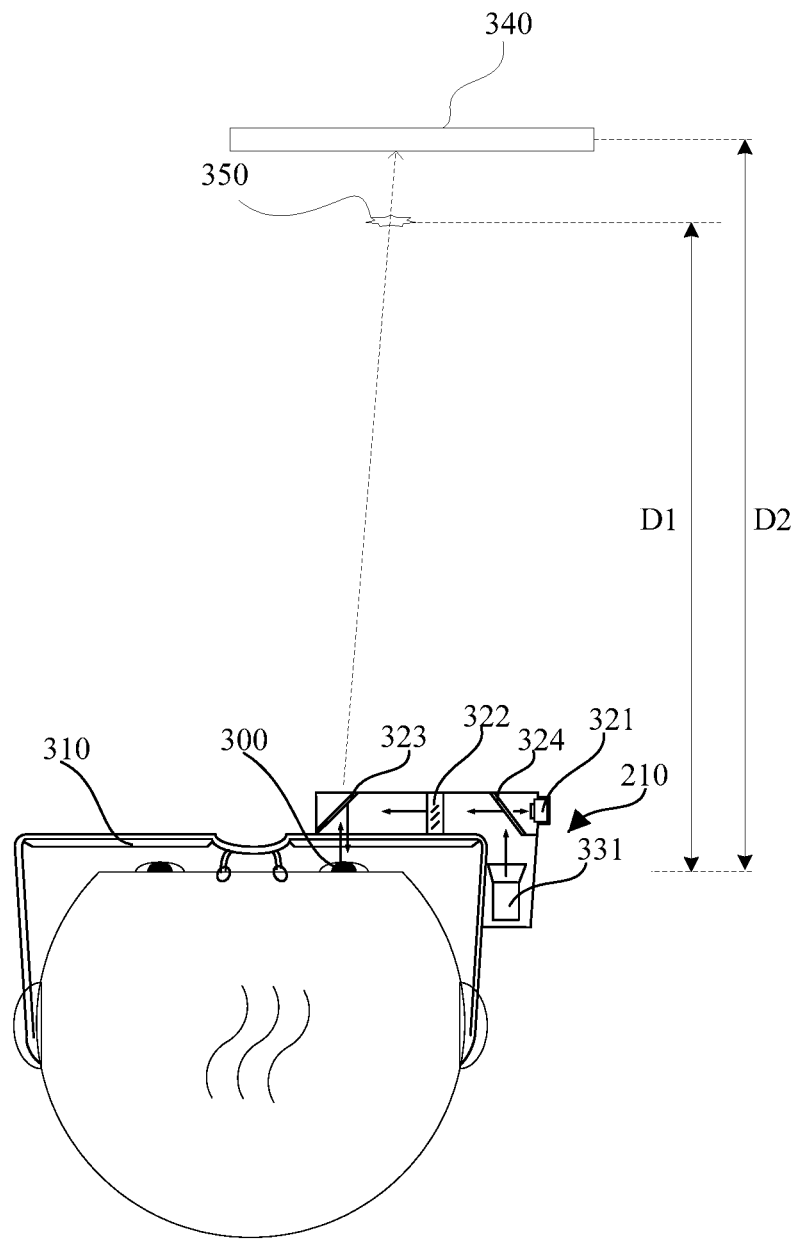
FIG. 3a and FIG. 3b are schematic application diagrams of an interaction apparatus according to an embodiment of this application.

As shown in FIG. 3a, in a possible implementation manner, the information acquiring module 210 is disposed on frame glasses 310 (or, in a possible implementation manner, the frame glasses themselves are the information acquiring module 210).

The information acquiring unit 211 comprises an image sensing element 321, configured to collect an image of an eye or a fundus of the user. To not hinder the user from watching an object in a real environment, a light path between the image sensing element 321 and the eye of the user is formed by means of a first light splitting element 323 disposed in front of the eye of the user, and moreover the user may see the object in the real environment by means of the first light splitting element 323.

In the implementation manner of collecting the image of the eye of the user, the information acquiring unit 211 may only comprise the image sensing element 321 and the first light splitting element 323.

In the implementation manner of needing to collect the image of the fundus of the user, optionally, the information acquiring unit 211 further comprises an imaging parameter adjustable lens element 322 located on a light path between the eye and the image sensing element 321, configured to adjust imaging parameters of the light path, and therefore when a focal distance of the eye of the user changes, by adjusting imaging parameters of the lens element 322, the image sensing element 321 can collect a sufficiently clear image of the fundus.

In a possible implementation manner, the virtual presentation unit 212 may comprise a projection element 331 and the first light splitting element 323, and is configured to project, to the fundus of the user, content that corresponds to the virtual presentation object and that is projected by the projection element 331.

In the implementation manner in which the focal distance of the eye of the user changes, the virtual presentation unit 212 may also reuse the lens element 322, configured to adjust imaging parameters between the projection element 331 and the eye, and therefore the content corresponding to the virtual presentation object is clearly projected to the fundus of the user.

In some possible implementation manners, the projection element 331 and the image sensing element 321 may reflect a light ray from the projection element 331 to the eye, and transmit a light ray from the eye to the image sensing 321 by means of a second light splitting element 324.

As shown in FIG. 3a, when the first gazing information is acquired (in this implementation manner, description is performed by using an example in which the first gazing information is first gazing distance information), the eye of the user watches a physical object 340, and the physical object 340 is transmitted to the fundus of the user through the first light splitting element 323 (such as a semi-reflecting and semi-transmitting eyeglass), to form a first image on the fundus of the user; a light ray corresponding to the image (which may comprise the first image and/or a distribution image of a blood vessel, a nerve or the like on the fundus of the user) of the fundus of the user is received by the image sensing element 321 after being reflected by the first light splitting element 323, and transmitted by the lens element 322 and the second light splitting element 324. In this case, imaging parameters of the lens element 322 may be adjusted (such imaging parameters as a focal distance and/or a location on a light path), and therefore the image sensing element 321 obtains a clear second image corresponding to the image of the fundus. In this case, the first gazing distance information may be obtained according to the imaging parameters on the light path between the eye and the image sensing element 321 and the image of the fundus.

When second gazing information is acquired, the content that corresponds to the virtual presentation object and that is projected by the projection element 331 enters the fundus of the user after being reflected by the second light splitting element 324, transmitted by the lens element 322 and reflected by the first light splitting element 322, and therefore the user sees the virtual presentation object 350. Then, by means of the foregoing method for acquiring the first gazing distance information, second gazing distance information of the user when watching the virtual presentation object 350 is acquired by means of the image sensing element 321.

The first gazing information and the second gazing information may be acquired in the implementation manner shown in FIG. 3a.

In a possible implementation manner, optionally, the operation may comprise:

an operation related to a virtual presentation distance corresponding to the virtual presentation object.

Figure 4B:
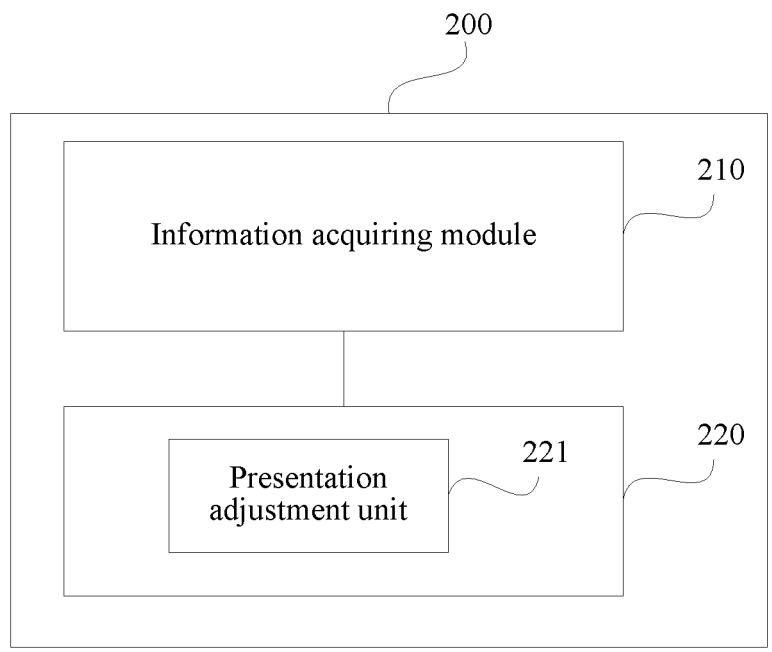

For example, in a possible implementation manner, as shown in FIG. 4b, the first processing execution module 220 may comprise:

a presentation adjustment unit 221, configured to: in response to that the difference between the first gazing information and the second gazing information is out of the set error range, adjust a virtual presentation distance corresponding to the virtual presentation object.

Figure 3B:
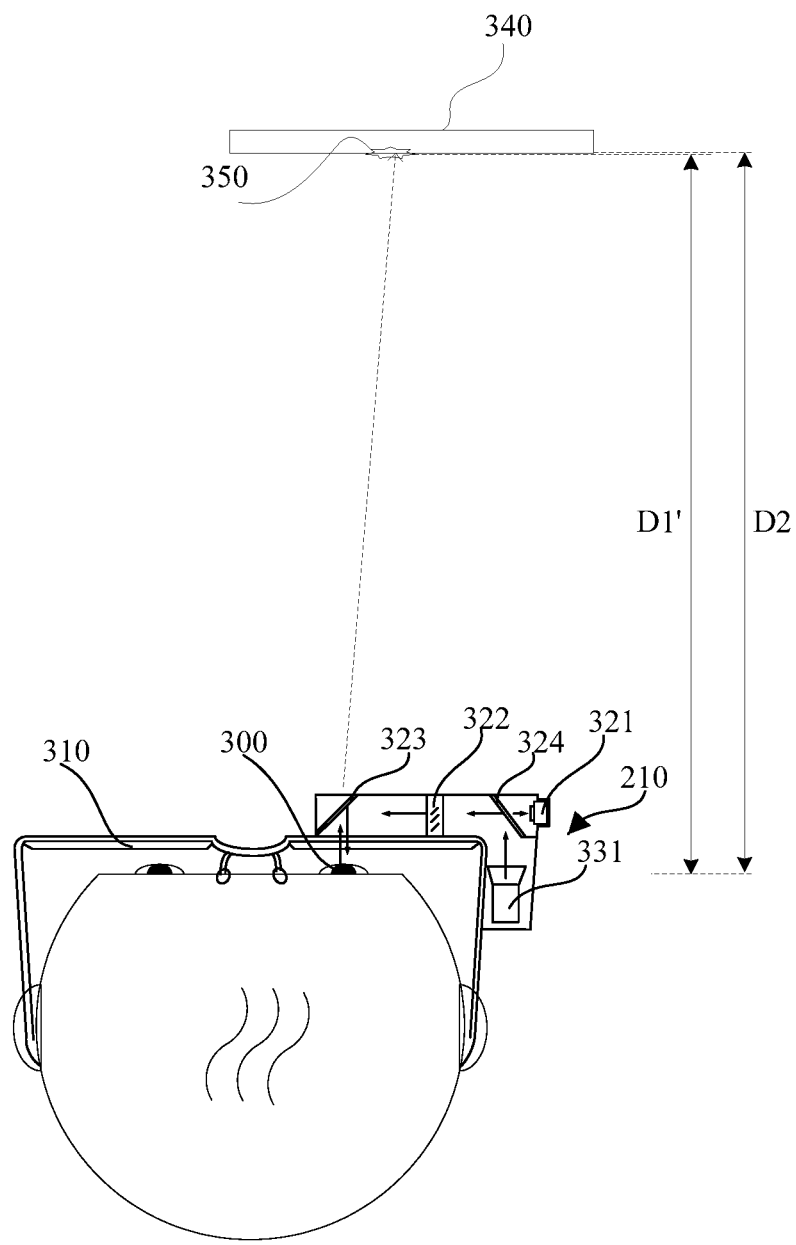

For example, in the implementation manner shown in FIG. 3*a*, a difference D1–D2 between the first gazing distance information and the second gazing distance information is greater than a set error range (in this implementation manner, the error range is that the difference is basically zero), and in this case, the virtual presentation distance may be adjusted, until the difference is within the set error range. FIG. 3*b* shows a situation in which after the virtual presentation distance is adjusted, it is obtained that the difference is within the error range.

In a possible implementation manner, optionally, the presentation adjustment unit 221 may be further configured to:

in response to that the difference between the first gazing information and the second gazing information is out of the set error range, adjust the virtual presentation distance according to the difference.

Figure 4C:
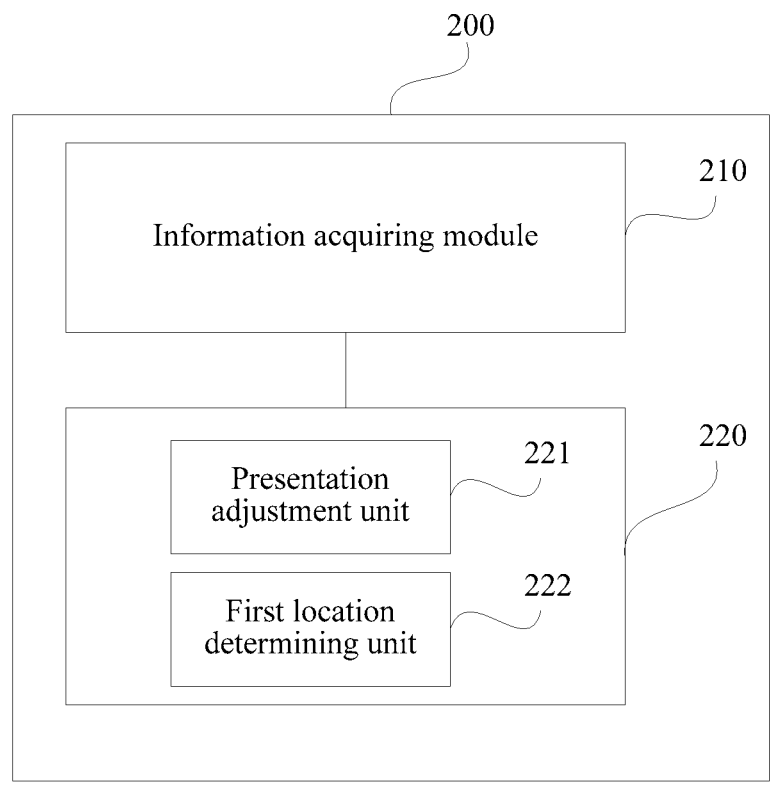

The inventor of this application finds that, in an augmented reality or virtual reality environment, to model a surrounding environment automatically is an important issue. Generally, fine modeling needs to be performed on an environment in the field of vision or an area in which a perspective virtual presentation object is planned to be projected, and many calculation capabilities need to be consumed. Therefore, in a possible implementation manner, as shown in FIG. 4*c*, the first processing execution module 220 further comprises:

a first location determining unit 222, configured to determine a location of the physical object relative to the user according to the gazing direction and the adjusted virtual presentation distance.

Figure 4D:
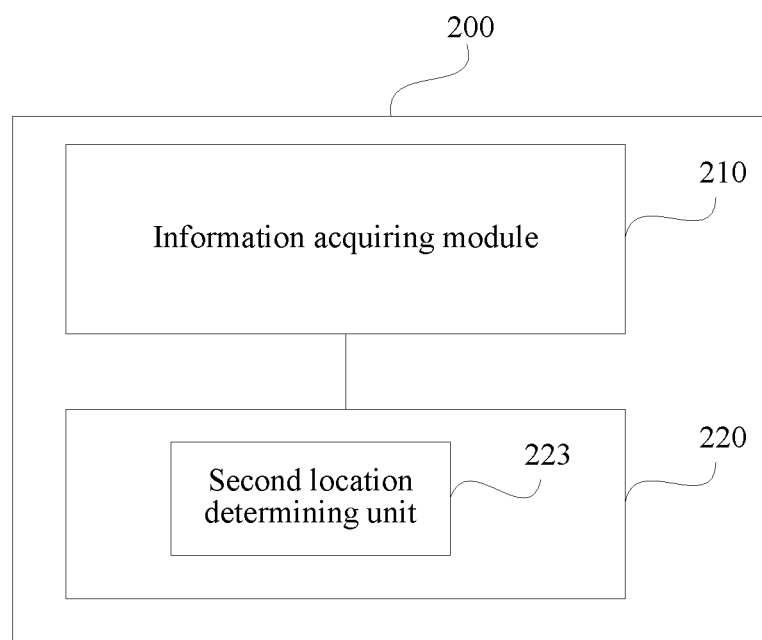

Alternatively, in a possible implementation manner, as shown in FIG. 4*d*, the first processing execution module 220 comprises:

a second location determining unit 223, configured to determine a location of the physical object relative to the user according to the gazing direction, a virtual presentation distance corresponding to the virtual presentation object and the difference.

It may be seen from the above description that, in this embodiment of this application, a location of the physical object relative to the user may be accurately obtained by means of the first gazing information and the second gazing information of the user, and then the physical object may be accurately modeled according to the location of the physical object relative to the user.

Figure 4E:
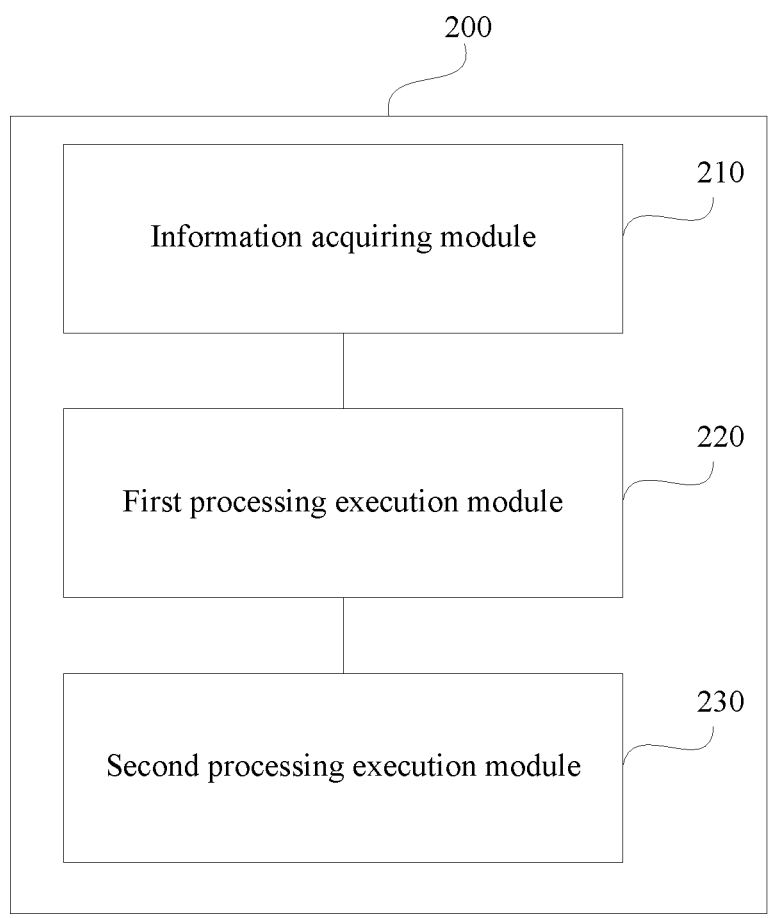

In a possible implementation manner, as shown in FIG. 4*e*, the apparatus 200 further comprises:

a second processing execution module 230, configured to: in response to that the difference is within the error range, determine a location of the physical object relative to the user according to the gazing direction and a virtual presentation distance corresponding to the virtual presentation object.

For further description about functions of modules and units in the foregoing apparatus embodiment, refer to corresponding description in the embodiment shown in FIG. 1, and details are not described herein again.

Figure 5:
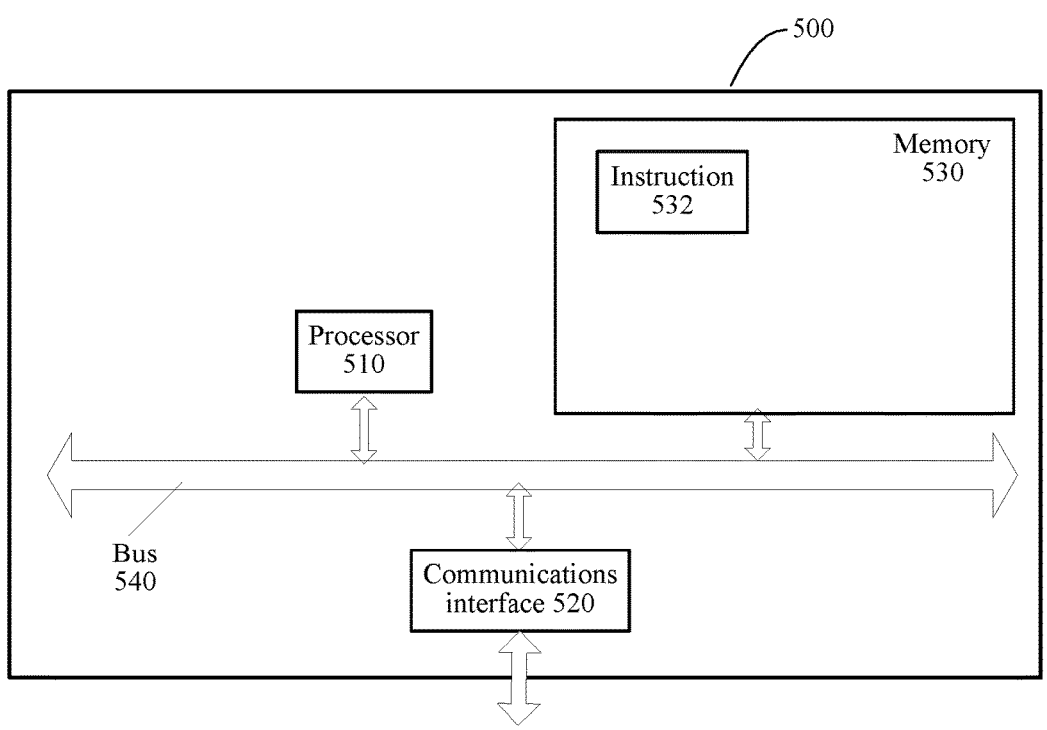
FIG. 5 is a schematic structural block diagram of a user equipment according to an embodiment of this application.

FIG. 5 is a schematic structural diagram of a user equipment 500 according to an embodiment of this application. Specific implementation of the user equipment 500 is not limited in specific embodiments of this application. As shown in FIG. 5, the user equipment 500 may comprise:

a processor (processor) 510, a communications interface (Communications Interface) 520, a memory (memory) 530, and a communication bus 540.

The processor 510, the communications interface 520, and the memory 530 communicate with each other through the communication bus 540.

The communications interface 520 is configured to communicate with a network element such as a client.

The processor 510 is configured to execute an instruction 532, and may specifically execute related steps in the method embodiment.

Specifically, the instruction 532 may comprise program code, where the program code comprises a computer operation instruction.

The processor 510 may be a central processing unit CPU, or an application specific integrated circuit ASIC (Application Specific Integrated Circuit), or one or more integrated circuits that are configured to implement the embodiment of this application.

The memory 530 is configured to store the instruction 532. The memory 530 may comprise a high-speed RAM memory, and may further comprise a non-volatile memory (non-volatile memory), for example, at least one disk memory. The instruction 532 may specifically be used to enable the user equipment 500 to perform the following steps:

acquiring first gazing information of at least one eye of a user when watching a virtual presentation object on a location in a gazing direction, and second gazing information of the at least one eye of the user when watching a physical object on the location in the gazing direction; and in response to that a difference between the first gazing information and the second gazing information is out of a set error range, executing an operation.

For specific implementation of steps in the instruction 532, reference may be made to corresponding description of related steps and units in the foregoing embodiment, which is not described here. It can be clearly understood by persons skilled in the art that, for the purpose of convenient and brief description, as for a specific working process of the foregoing device and module, reference can be made to the corresponding process in the foregoing method embodiments, and the details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and comprises several instructions for instructing a computer device (which may be a personal computer, a server, a network device, and the like) to perform all or a part of the steps of the method described in the embodiment of this application. The foregoing storage medium comprises: any medium that can store program codes, such as a USB flash disk, a removable hard disk, a read-only memory (ROM, Read-Only Memory), a random access memory (RAM, Random Access Memory), a magnetic disk, or an optical disk.

The foregoing implementation manners are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. An interaction method, comprising:
   acquiring first gazing information of at least one eye of a user when watching a virtual presentation object on a location in a gazing direction, and second gazing information of the at least one eye of the user when watching a physical object on the location in the gazing direction; and
   in response to that a difference between the first gazing information and the second gazing information is out of a set error range, executing an operation.

2. The method of claim 1, wherein the acquiring the first gazing information comprises:
   presenting the virtual presentation object to the at least one eye at a virtual presentation distance and in the gazing direction; and
   acquiring the first gazing information of the at least one eye.

3. The method of claim 1, wherein the acquiring the first gazing information and the second gazing information comprises:
   presenting the virtual presentation object to the at least one eye at a virtual presentation distance and in a presentation direction;
   acquiring the first gazing information and the gazing direction of the at least one eye; and
   weakening or eliminating presentation of the virtual presentation object, and acquiring the second gazing information that is of the at least one eye and that is in the gazing direction.

4. The method of claim 1, wherein the acquiring the first gazing information and the second gazing information comprises:
   acquiring the gazing direction and the second gazing information of the at least one eye;
   determining a presentation direction of the virtual presentation object corresponding to the gazing direction according to the gazing direction;
   presenting the virtual presentation object to the at least one eye at a virtual presentation distance and in the presentation direction; and
   acquiring the first gazing information.

5. The method of claim 1, wherein
   the first gazing information comprises: first gazing distance information; and
   the second gazing information comprises: second gazing distance information.

6. The method of claim 1, wherein
   the first gazing information comprises: first electro-ocular information; and
   the second gazing information comprises: second electro-ocular information.

7. The method of claim 1, wherein the at least one eye comprises two eyes.

8. The method of claim 7, wherein
   the first gazing information comprises: first gazing angle information; and
   the second gazing information comprises: second gazing angle information.

9. The method of claim 1, wherein the operation comprises:
   an operation related to a virtual presentation distance corresponding to the virtual presentation object.

10. The method of claim 1, wherein the executing the operation comprises:
    adjusting a virtual presentation distance corresponding to the virtual presentation object.

11. The method of claim 10, wherein the executing the operation comprises:
    adjusting the virtual presentation distance according to the difference.

12. The method of claim 10, wherein the method further comprises:
    determining a location of the physical object relative to the user according to the gazing direction and the adjusted virtual presentation distance.

13. The method of claim 1, wherein the executing the operation comprises:
    determining a location of the physical object relative to the user according to the gazing direction, a virtual presentation distance corresponding to the virtual presentation object and the difference.

14. The method of claim 1, wherein the method further comprises:
    in response to that the difference is within the error range, determining a location of the physical object relative to the user according to the gazing direction and a virtual presentation distance corresponding to the virtual presentation object.

15. An interaction apparatus, comprising:
    an information acquiring module, configured to acquire first gazing information of at least one eye of a user when watching a virtual presentation object on a location in a gazing direction, and second gazing information of the at least one eye of the user when watching a physical object on the location in the gazing direction; and
    a first processing execution module, configured to: in response to that a difference between the first gazing information and the second gazing information is out of a set error range, execute an operation.

16. The apparatus of claim 15, wherein the information acquiring module comprises:
    a virtual presentation unit, configured to present the virtual presentation object to the at least one eye at a virtual presentation distance and in the gazing direction; and
    an information acquiring unit, configured to acquire the first gazing information of the at least one eye on a condition that the virtual presentation unit presents the virtual presentation object.

17. The apparatus of claim 15, wherein
    the first gazing information comprises: first gazing distance information; and
    the second gazing information comprises: second gazing distance information.

18. The apparatus of claim 15, wherein
the first gazing information comprises: first electro-ocular information; and
the second gazing information comprises: second electro-ocular information.

19. The apparatus of claim 15, wherein the at least one eye comprises two eyes.

20. The apparatus of claim 19, wherein
the first gazing information comprises: first gazing angle information; and
the second gazing information comprises: second gazing angle information.

21. The apparatus of claim 15, wherein the operation comprises:
an operation related to a virtual presentation distance corresponding to the virtual presentation object.

22. The apparatus of claim 15, wherein the first processing execution module comprises:
a presentation adjustment unit, configured to: in response to that the difference between the first gazing information and the second gazing information is out of the set error range, adjust a virtual presentation distance corresponding to the virtual presentation object.

23. The apparatus of claim 22, wherein the presentation adjustment unit is further configured to:
in response to that the difference between the first gazing information and the second gazing information is out of the set error range, adjust the virtual presentation distance according to the difference.

24. The apparatus of claim 22, wherein the first processing execution module further comprises:
a first location determining unit, configured to determine a location of the physical object relative to the user according to the gazing direction and the adjusted virtual presentation distance.

25. The apparatus of claim 15, wherein the first processing execution module comprises:
a second location determining unit, configured to determine a location of the physical object relative to the user according to the gazing direction, a virtual presentation distance corresponding to the virtual presentation object and the difference.

26. The apparatus of claim 15, wherein the apparatus further comprises:
a second processing execution module, configured to: in response to that the difference is within the error range, determine a location of the physical object relative to the user according to the gazing direction and a virtual presentation distance corresponding to the virtual presentation object.

27. A user equipment, wherein the user equipment comprises:
a memory, configured to store an instruction; and
a processor, configured to execute the instruction stored in the memory, wherein the instruction enables the processor to execute the following operations:
acquiring first gazing information of at least one eye of a user when watching a virtual presentation object on a location in a gazing direction, and second gazing information of the at least one eye of the user when watching a physical object on the location in the gazing direction; and
in response to that a difference between the first gazing information and the second gazing information is out of a set error range, executing an operation.

* * * * *